(12) United States Patent
Faber et al.

(10) Patent No.: US 10,765,972 B2
(45) Date of Patent: Sep. 8, 2020

(54) APPARATUS AND METHOD FOR PURIFICATION OF A FLUID BY MEANS OF A FILTER BED

(71) Applicant: Paques I.P. B.V., Balk (NL)

(72) Inventors: Jelle Faber, Jubbega (NL); Pieter van der Heiden, Hoonhorst (NL); René Alexander Rozendal, Elahuizen (NL)

(73) Assignee: Paques I.P. B.V., Balk (NL)

( * ) Notice: Subject to any disclaimer, the term of this patent is extended or adjusted under 35 U.S.C. 154(b) by 283 days.

(21) Appl. No.: 15/738,135

(22) PCT Filed: Jul. 1, 2016

(86) PCT No.: PCT/NL2016/050473
§ 371 (c)(1),
(2) Date: Dec. 20, 2017

(87) PCT Pub. No.: WO2017/007307
PCT Pub. Date: Jan. 12, 2017

(65) Prior Publication Data
US 2018/0169546 A1 Jun. 21, 2018

(30) Foreign Application Priority Data
Jul. 3, 2015 (EP) .................................... 15175296

(51) Int. Cl.
*B01D 24/30* (2006.01)
*B01D 24/46* (2006.01)
*B01D 24/26* (2006.01)

(52) U.S. Cl.
CPC .............. *B01D 24/30* (2013.01); *B01D 24/26* (2013.01); *B01D 24/4689* (2013.01); *B01D 2201/48* (2013.01)

(58) Field of Classification Search
None
See application file for complete search history.

(56) References Cited

U.S. PATENT DOCUMENTS 579,039 A * 3/1897 Brashear .................. B01J 47/10
210/189
650,611 A * 5/1900 Reeves .................. B01D 29/03
210/351

(Continued)

FOREIGN PATENT DOCUMENTS

WO 2012116404 A1 9/2012

*Primary Examiner* — Robert J Popovics
(74) *Attorney, Agent, or Firm* — N.V. Nederlandsch Octrooibureau; Catherine A. Shultz; Katelyn J. Bernier

(57) ABSTRACT

The invention provides an apparatus and method for purification of a fluid, the apparatus comprising:
- a vessel (1) for receiving, in operation, a filter bed (2) with granular filter material;
- a transport system (8) configured to, during operation, transport filter material from a cavity (5) underneath the filter bed (2) to a location (17) above the filter bed;
- a fluid inlet (14) for introducing fluid to be purified into the apparatus;
- a mixing section (3) adapted to, in operation, provide a mixture of fluid from the fluid inlet and granular filter material from the filter bed in a part of the vessel beneath the mixing section; and
- a plurality of gas lift injectors (4), wherein each gas lift injector (4) is configured to, in operation, transport the mixture of fluid from the fluid inlet (14) and granular filter material from the filter bed (2) to the cavity (5).

17 Claims, 6 Drawing Sheets

(56) References Cited

U.S. PATENT DOCUMENTS

| | | | | |
|---|---|---|---|---|
| 1,007,929 A * | 11/1911 | Deacon et al. | B01D 24/30 | 210/87 |
| 1,130,382 A * | 3/1915 | Deacon et al. | B01D 24/30 | 210/189 |
| 1,179,658 A * | 4/1916 | Rothwell | C02F 1/003 | 210/85 |
| 1,608,661 A * | 11/1926 | Nordell | B01J 47/10 | 210/676 |
| 1,861,295 A * | 5/1932 | Bramwell | B01D 24/002 | 210/189 |
| 1,903,612 A * | 4/1933 | Dotterweich | C02F 1/42 | 210/189 |
| 2,468,838 A * | 5/1949 | Rey | B01D 24/12 | 210/189 |
| 2,683,109 A * | 7/1954 | Norris | C10G 11/02 | 208/166 |
| 2,735,803 A * | 2/1956 | Leffer | B01J 8/1881 | 208/173 |
| 2,793,915 A * | 5/1957 | Evans | B01J 8/0025 | 406/143 |
| 2,813,755 A * | 11/1957 | Payne | B01J 8/003 | 406/132 |
| 3,598,235 A * | 8/1971 | Demeter | B01D 24/06 | 210/793 |
| 3,667,604 A * | 6/1972 | Lagoutte | B01D 24/30 | 210/136 |
| 3,767,048 A * | 10/1973 | Prengemann | B01D 24/30 | 210/786 |
| 3,853,752 A * | 12/1974 | Tymoszczuk | C02F 3/06 | 210/618 |
| 3,929,640 A * | 12/1975 | Dohnert | B01D 21/0018 | 210/195.4 |
| 3,968,034 A * | 7/1976 | Tymoszczuk | C02F 3/06 | 210/618 |
| 3,998,739 A * | 12/1976 | Morimoto | B01D 24/08 | 210/189 |
| 4,008,159 A * | 2/1977 | Besik | C02F 3/04 | 210/601 |
| 4,052,300 A * | 10/1977 | Mosso | B01D 24/008 | 210/786 |
| 4,060,484 A * | 11/1977 | Austin | B01D 24/30 | 210/786 |
| 4,126,546 A * | 11/1978 | Hjelmner | B01D 24/16 | 210/741 |
| 4,197,201 A * | 4/1980 | Hjelmner | B01D 24/002 | 210/189 |
| 4,238,335 A * | 12/1980 | Grimsley | B01D 24/06 | 210/802 |
| 4,240,911 A * | 12/1980 | Demeter | B01D 24/06 | 210/189 |
| 4,246,102 A * | 1/1981 | Hjelmner | B01D 24/4689 | 210/704 |
| 4,265,767 A * | 5/1981 | Gappa | B01D 15/02 | 210/662 |
| 4,276,178 A * | 6/1981 | Gappa | B01D 15/02 | 210/662 |
| 4,330,401 A * | 5/1982 | Boze | C02F 1/5281 | 210/106 |
| 4,340,485 A * | 7/1982 | Ikeda | B01D 15/02 | 210/189 |
| 4,399,034 A * | 8/1983 | Moller | B01D 24/06 | 210/268 |
| 4,441,998 A * | 4/1984 | Ueda | B01D 24/12 | 210/275 |
| 4,482,458 A * | 11/1984 | Rovel | C02F 3/223 | 210/150 |
| 4,496,464 A * | 1/1985 | Hensley | B01D 24/105 | 210/269 |
| 4,592,837 A * | 6/1986 | Ludwig | B01D 24/30 | 210/189 |
| 4,617,175 A * | 10/1986 | Tolpin | B01D 53/60 | 422/171 |
| 4,622,210 A * | 11/1986 | Hirschberg | B01D 53/08 | 422/144 |
| 4,720,347 A * | 1/1988 | Berne | B01D 24/30 | 210/792 |
| 4,787,987 A * | 11/1988 | Hensley | B01D 24/12 | 210/792 |
| 4,826,609 A * | 5/1989 | Hensley | B01D 24/4884 | 210/792 |
| 4,842,744 A * | 6/1989 | Schade | B01D 24/30 | 210/636 |
| 4,861,472 A * | 8/1989 | Weis | B01D 24/30 | 210/189 |
| 4,871,459 A * | 10/1989 | Titoff | B01D 21/0018 | 210/519 |
| 4,891,142 A * | 1/1990 | Hering, Jr. | B01D 24/007 | 210/792 |
| 4,900,434 A * | 2/1990 | Schade | B01D 24/30 | 210/189 |
| 4,966,698 A * | 10/1990 | Hensley | B01D 36/001 | 210/269 |
| 5,019,278 A * | 5/1991 | Jacquet | B01D 24/30 | 210/189 |
| 5,112,504 A * | 5/1992 | Johnson | B01D 24/386 | 210/792 |
| 5,154,824 A * | 10/1992 | Anderson | B01D 24/12 | 210/274 |
| 5,173,194 A * | 12/1992 | Hering, Jr. | B01D 24/4689 | 210/792 |
| 5,217,609 A * | 6/1993 | Holdeman | B01D 21/2466 | 210/195.3 |
| 5,252,230 A * | 10/1993 | Dunkers | B01D 24/002 | 210/792 |
| 5,277,829 A * | 1/1994 | Ward | B01D 24/30 | 210/792 |
| 5,328,593 A * | 7/1994 | Owen | C10G 11/182 | 208/113 |
| 5,346,610 A * | 9/1994 | Owen | C10G 11/182 | 208/113 |
| 5,407,574 A * | 4/1995 | Hensley | B01D 24/12 | 210/269 |
| 5,433,862 A * | 7/1995 | Batson | B01D 21/0042 | 210/521 |
| 5,454,959 A * | 10/1995 | Stevens | B01D 24/30 | 210/792 |
| 5,462,654 A * | 10/1995 | Hering, Jr. | B01D 24/30 | 210/189 |
| 5,472,610 A * | 12/1995 | Jonsson | C02F 3/06 | 210/617 |
| 5,474,585 A * | 12/1995 | Geibel | B01D 29/33 | 55/302 |
| 5,520,804 A * | 5/1996 | Ward | B01D 24/004 | 210/189 |
| 5,543,037 A * | 8/1996 | Hering, Jr. | B01D 24/30 | 210/104 |
| 5,549,827 A * | 8/1996 | Batson | B01D 21/0042 | 210/519 |
| 5,573,663 A * | 11/1996 | Junius | B01D 24/002 | 210/189 |
| 5,582,722 A * | 12/1996 | Wachinski | B01D 24/007 | 210/189 |
| 5,630,936 A * | 5/1997 | Oyzboyd | C02F 3/223 | 210/195.3 |
| 5,681,472 A * | 10/1997 | Jonsson | B01D 24/30 | 210/618 |
| 5,698,106 A * | 12/1997 | Larsson | B01D 24/30 | 210/675 |
| 5,730,886 A * | 3/1998 | Wachinski | B01D 24/007 | 210/792 |
| 5,735,600 A * | 4/1998 | Wyness | B01F 13/02 | 366/101 |
| 5,746,913 A * | 5/1998 | Chang | B01D 24/30 | 210/189 |
| 5,755,959 A * | 5/1998 | Jonsson | B01D 24/4689 | 210/189 |
| 5,843,308 A * | 12/1998 | Suozzo | B01D 24/30 | 210/195.1 |

(56) References Cited

U.S. PATENT DOCUMENTS

| | | | | |
|---|---|---|---|---|
| 6,077,426 | A * | 6/2000 | Grabowski | B01D 24/00 210/189 |
| 6,077,446 | A * | 6/2000 | Steiner | B01D 24/28 210/760 |
| 6,103,109 | A * | 8/2000 | Noyes | C02F 3/04 210/151 |
| 6,143,186 | A * | 11/2000 | Van Unen | B01D 24/30 210/786 |
| 6,319,396 | B1 * | 11/2001 | Heagey | B01D 17/00 210/151 |
| 6,319,413 | B1 * | 11/2001 | Xia | B01D 29/44 210/676 |
| 6,326,191 | B2 * | 12/2001 | VanToever | B01J 19/30 210/167.01 |
| 6,334,956 | B1 * | 1/2002 | Hanemaaijer | B01D 15/02 210/198.2 |
| 6,355,172 | B1 * | 3/2002 | Diels | C02F 3/085 210/610 |
| 6,361,701 | B1 * | 3/2002 | Schade | B01D 24/08 210/786 |
| 6,387,283 | B1 * | 5/2002 | Lind | B01D 24/30 210/786 |
| 6,426,005 | B1 * | 7/2002 | Larsson | B01D 24/007 210/650 |
| 6,517,712 | B2 * | 2/2003 | Xia | B01D 29/114 210/189 |
| 6,617,155 | B1 * | 9/2003 | Van Toever | B01J 19/30 210/196 |
| 6,641,737 | B2 * | 11/2003 | Xia | B01D 24/30 210/676 |
| 6,790,351 | B2 * | 9/2004 | Xia | B01D 24/30 210/189 |
| 6,874,644 | B1 * | 4/2005 | Wagener | B01D 11/0246 210/511 |
| 6,881,350 | B2 * | 4/2005 | Wilson | B01D 21/0045 210/512.1 |
| 7,381,336 | B2 * | 6/2008 | Stedman | B01D 24/4689 210/741 |
| 7,399,416 | B2 * | 7/2008 | Moller | B01D 21/01 210/673 |
| 7,445,721 | B2 * | 11/2008 | Moller | B01D 21/01 210/760 |
| 7,553,418 | B2 * | 6/2009 | Khudenko | C02F 1/004 210/601 |
| 7,713,423 | B2 * | 5/2010 | Moller | B01D 21/01 210/667 |
| 7,713,426 | B2 * | 5/2010 | Newcombe | C02F 3/223 210/650 |
| 7,744,764 | B2 * | 6/2010 | Moller | B01D 21/01 210/661 |
| 7,897,040 | B2 * | 3/2011 | Newcombe | B01D 24/30 210/108 |
| 7,972,509 | B2 * | 7/2011 | Newcombe | B01D 24/30 210/269 |
| 8,012,359 | B2 * | 9/2011 | Parkinson | B01D 24/4689 210/786 |
| 8,071,055 | B2 * | 12/2011 | Newcombe | C02F 1/44 422/534 |
| 8,080,163 | B2 * | 12/2011 | Moller | C02F 1/288 210/667 |
| 8,152,998 | B2 * | 4/2012 | Xia | B01D 24/4689 210/189 |
| 8,206,599 | B2 * | 6/2012 | Newcombe | B01D 24/30 210/792 |
| 8,268,271 | B2 * | 9/2012 | Daugaard | B01D 46/38 423/210 |
| RE44,570 | E * | 11/2013 | Moller | B01D 21/01 210/667 |
| 9,498,740 | B2 * | 11/2016 | Newcombe | B01D 24/30 |
| 10,112,847 | B2 * | 10/2018 | Streng | B01D 24/14 |
| 10,351,455 | B2 * | 7/2019 | Moller | B01J 20/20 |
| 2002/0023885 | A1 * | 2/2002 | Lind | B01D 24/30 210/792 |
| 2002/0036164 | A1 * | 3/2002 | Xia | B01D 29/114 210/263 |
| 2003/0066792 | A1 * | 4/2003 | Xia | B01D 24/42 210/189 |
| 2004/0050762 | A1 * | 3/2004 | Xia | B01D 24/4689 210/189 |
| 2004/0104183 | A1 * | 6/2004 | Wilson | B01D 21/0093 210/801 |
| 2004/0144728 | A1 * | 7/2004 | Moller | B01D 24/4684 210/688 |
| 2005/0077247 | A1 * | 4/2005 | Stedman | B01D 24/4689 210/741 |
| 2006/0000785 | A1 * | 1/2006 | Moller | B01D 24/105 210/760 |
| 2007/0187329 | A1 * | 8/2007 | Moller | C02F 1/5245 210/670 |
| 2008/0257807 | A1 * | 10/2008 | Parkinson | B01D 24/30 210/175 |
| 2008/0277349 | A1 * | 11/2008 | Moller | B01D 24/4684 210/673 |
| 2008/0302726 | A1 * | 12/2008 | Moller | B01D 24/105 210/661 |
| 2009/0045135 | A1 * | 2/2009 | Khudenko | C02F 3/06 210/631 |
| 2009/0071909 | A1 * | 3/2009 | Newcombe | B01D 24/30 210/739 |
| 2009/0101568 | A1 * | 4/2009 | Donaque | B01D 24/30 210/288 |
| 2009/0178980 | A1 * | 7/2009 | Newcombe | C02F 1/006 210/748.12 |
| 2011/0024369 | A1 * | 2/2011 | Reekers | B01D 24/30 210/786 |
| 2011/0100888 | A1 * | 5/2011 | Newcombe | B01D 24/30 210/189 |
| 2011/0100925 | A1 * | 5/2011 | Newcombe | C02F 1/001 210/739 |
| 2011/0182788 | A1 * | 7/2011 | Daugaard | C10K 1/024 423/210 |
| 2011/0290734 | A1 * | 12/2011 | Xia | B01D 24/10 210/676 |
| 2012/0261357 | A1 * | 10/2012 | Larsson | B01D 24/46 210/786 |
| 2013/0118990 | A1 * | 5/2013 | Newcombe | B01D 24/4673 210/739 |
| 2013/0341278 | A1 * | 12/2013 | Moller | B01J 20/3475 210/661 |
| 2014/0246388 | A1 * | 9/2014 | Larsson | B01D 24/46 210/792 |
| 2016/0137532 | A1 * | 5/2016 | Slough | B01J 39/05 210/661 |
| 2017/0080360 | A1 * | 3/2017 | Gutierrez | B01D 24/4853 |
| 2017/0136390 | A1 * | 5/2017 | Newcombe | B01D 24/30 |
| 2018/0140973 | A1 * | 5/2018 | Newcombe | B01D 24/30 |
| 2018/0169546 | A1 * | 6/2018 | Faber | B01D 24/26 |
| 2018/0229156 | A1 * | 8/2018 | Strain | B01D 24/4892 |

* cited by examiner

APPARATUS AND METHOD FOR PURIFICATION OF A FLUID BY MEANS OF A FILTER BED

FIELD OF THE INVENTION

The invention relates to an apparatus and a method for the purification of a fluid, such as industrial waste water or groundwater, by means of a filter bed.

BACKGROUND OF THE INVENTION

Different types of filter bed reactors for purifying or refining a fluid or liquid are known in the art. In the conventional stationary filters, solids are progressively accumulated in the filter bed, increasing the head loss until the filter material must be cleaned by backwashing before treatment can resume. The times between backwashings can vary, and if these times are too short, the effective operating time of the system can be considerably reduced.

In continuous bed filter reactors, the fluid to be purified is conducted through the filter bed and the filter material is brought to motion by means of a transport system. Bringing to motion the filter material is often done by making the filter material circulate through the filter bed, for example by bringing the filter material from the bottom of the filter bed to the top where it is deposited, either before or after the filter material is treated, and letting it drop again to the filter bed, so that it can continuously keep moving from the bottom to the top. These are in general auto-refining systems, wherein the eliminated parts are continuously drained in a concentrated stream.

This type of continuous bed filter reactors are increasingly being used for the refinement of industrial and domestic waste water, and for the purification of drinking water.

EP 730 895 A1 discloses a typical prior art sand filter, comprising a cylindrical vessel with an oblique conical bottom along which the filter material of the filter bed slides down before it is lifted with an air lift for purification. Water to be cleaned is generally introduced in an inlet in the top half of the vessel. These apparatuses have the disadvantage, due to the conical bottom, of being normally quite high, around 6 to 7 meters. This can make construction more complicated and expensive. Furthermore, the filter bed is often unevenly loaded and, as a consequence, preferred fluid paths might be created, especially as the diameter of the filter is bigger. For both reasons, the diameter of this type of filters is normally limited to a maximum of 4 meters.

SUMMARY OF THE INVENTION

The invention provides an apparatus for purification of a fluid. The apparatus comprises:
- a vessel for receiving, in operation, a filter bed with granular filter material;
- a transport system configured to, during operation, transport filter material from a cavity underneath the filter bed to a location above the filter bed;
- a fluid inlet for introducing fluid to be purified into the apparatus;
- a mixing section adapted to provide, in operation, a mixture of fluid from the fluid inlet and granular filter material from the filter bed; and
- a plurality of gas lift injectors, wherein each gas lift injector is configured to, in operation, transport the mixture of fluid from the fluid inlet and granular filter material from the filter bed to the cavity.

The bottom of the vessel may be flat (as seen from the outside), or at least comprise a significant flat part. The above described features make the oblique conical bottom of prior art vessels unnecessary, allowing a simpler construction. The gas lift injectors may be tilted diagonally. The gas lift injectors may be arranged in an off-centre pattern so that each gas lift injector covers a part of the flat bottom of the vessel. That way, the mixture that rests on or near the bottom of the vessel is effectively brought to the cavity for further transport upwards. One or more of the fluid inlet, mixing section, and gas lift injectors will generally be provided in the lower half of the vessel. The term "lower half of the vessel" is used to indicate a location which is near to the bottom of the vessel, at least nearer to the bottom than to the top. This location can also be in the lower third of the vessel, or in the lower quartile of the vessel. In general, the fluid inlet and the cavity underneath the filter bed can be close to the bottom of the vessel. Because the gas lift injectors transport a mixture of fluid to be purified and granular material coming from the filter bed towards a cavity for further transport upwards, the downward-narrowing conical shape of prior art filter bed reactors is no longer necessary. This simplifies production of the apparatus according the invention, and makes the use of certain materials (e.g. polymers) practical to use. The present invention also provides a filter device that can be shorter than the traditional filter bed reactors.

This disclosure describes a gas lift injector as the means for transporting the mixture from the compartments to the cavity. A gas lift injector is a convenient means to achieve this, since the gas also aids the working of the riser pipe for transport to the higher part of the vessel. However, the disclosure is not limited to the use of gas lift injectors. Where this disclosure refers to a gas lift injectors, also other types of transport system can be indicated (e.g. a pump-activated transport system). What is relevant is that the gas lift injector moves the mixture to the cavity and does not inhibit the transport system between cavity and the higher part of the vessel from working.

In an embodiment according the invention, the apparatus comprises a mixing section in the lower half of the vessel, wherein the open top of the mixing section is in fluid connection with the filter bed and the open bottom of the mixing section is in fluid connection with the fluid inlet. In an embodiment, the mixing section is divided, by one or more cross pieces, into a plurality of compartments. In an embodiment, the top opening of the mixing section is larger than the bottom opening, so that the mixing section effectively has a funnel shape. In an embodiment, the mixing section is configured to bring, in operation, a mixture of influent fluid and granular material to an inlet of the at least one gas lift injector.

The invention provides an array of a plurality of apparatuses as described above, wherein at least two of the plurality of apparatuses are interconnected to distribute the fluid to be purified among the at least two of the apparatuses.

The invention further provides a method for purification of a fluid, the method comprising the steps of:
- introducing influent fluid to be purified into an apparatus for purification;
- mixing the influent fluid with granular filter material from a filter bed in the apparatus for purification; and
- feeding mixture of the influent fluid with granular filter material via a plurality of gas lift injectors to a transport system for bringing the filter material from underneath the filter bed to above the filter bed.

BRIEF DESCRIPTION OF THE FIGURES

On the attached drawing sheets, wherein like numbers reference like elements.

DETAILED DESCRIPTION

The present invention will now be described in relation with the accompanying figures.

It should be noted that, throughout the following description, embodiments of the invention will be described in which sand is used as the filter material. It should however be understood that this filter material can be any other suitable type of filter material as known in the art, such as quartzite sand, granite sand, gravel, anthracite or activated carbon.

In addition, embodiments of the present invention consider that the fluid to be purified is water, but the present invention is not limited thereto, and it can be applied to any suitable fluid.

Figure 1:
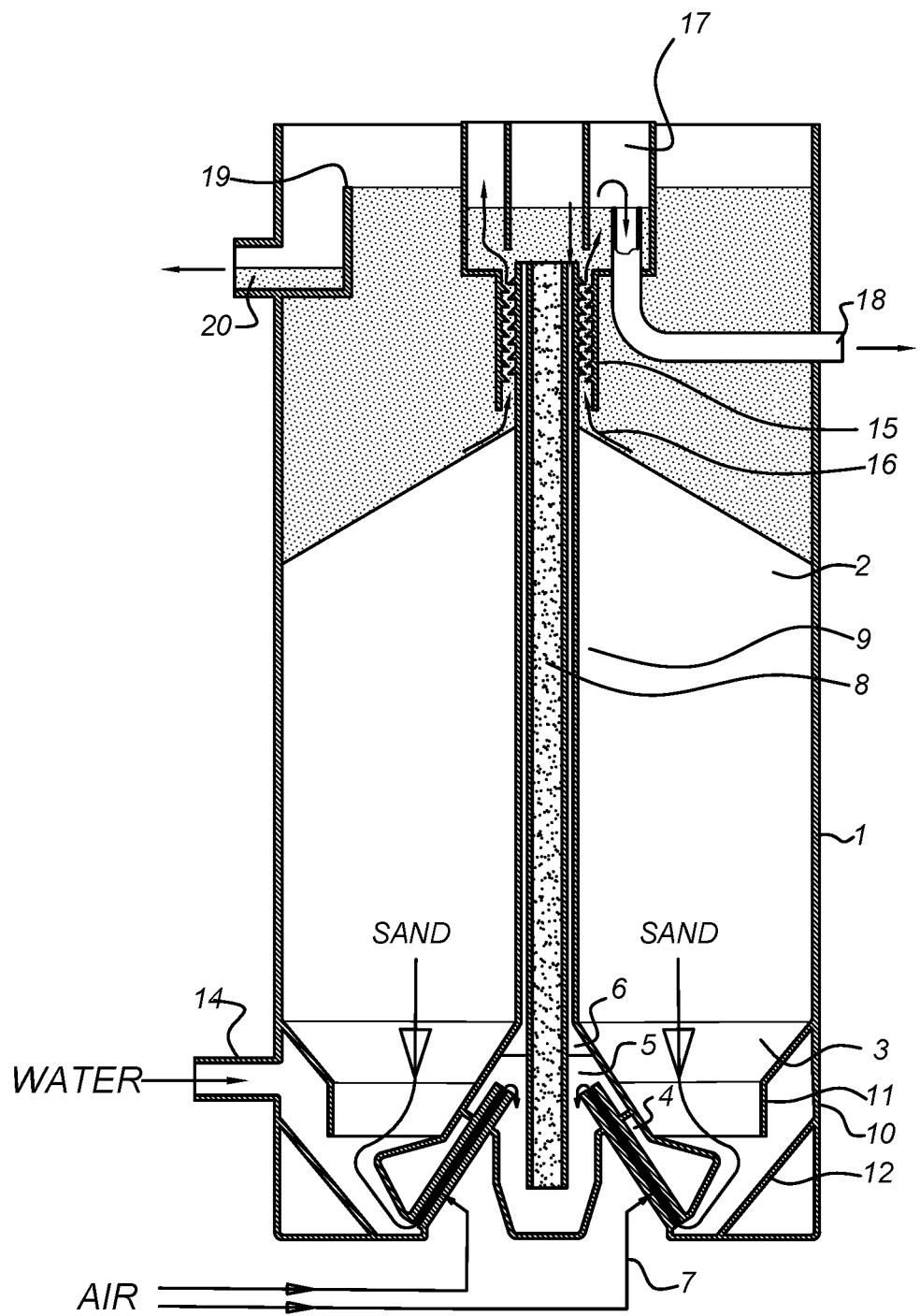
FIG. 1 schematically shows an apparatus in accordance with an embodiment of the present invention.
Figure 6A:
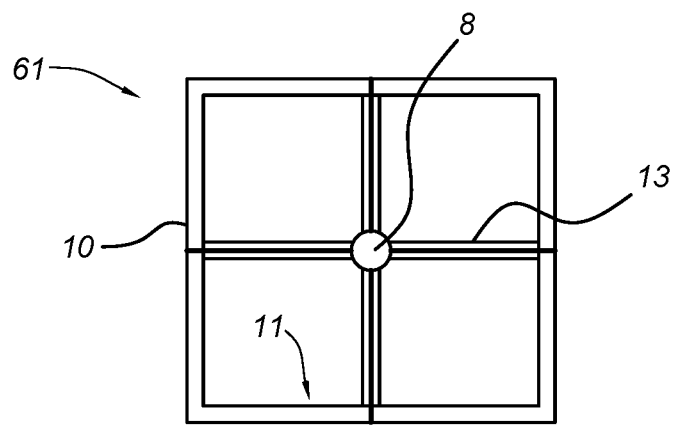
FIG. 6a illustrates an apparatus according to an embodiment of the invention with a rectangular perimeter.

In the accompanying FIG. 1, 1 designates a vessel or tank with a filter bed 2 of filter material, in this example sand of a specific grain size. The vessel 1 is constituted by a cylindrical section, with no need for a conical bottom such as the one that known sand filters have, but with a bottom cylindrical section of the same diameter as the filter bed located underneath the filter bed. This bottom cylindrical section includes a mixing section 3 comprising at least one compartment, preferably a plurality of compartments. Each of compartment may have a downward narrowing so that it acts like a funnel. In an embodiment according to the present invention, the mixing section 3 includes at least three compartments that each have downward narrowings, so that they act like funnels located forming a circle around the bottom cylindrical section. The invention is however not limited thereto, and a different number of compartments can be provided, for example 2, 3, 4 (as shown in FIG. 6a), 5, 6 (shown in FIGS. 2-4), 7, 8, or more. By means of this funnel structure of compartments around the centre of the mixing section, a flatter bottom section is provided, and the mixture of sand and water can be brought into the transport system from different locations around the mixing section. This mixing section 3 has an open top so that influent from fluid inlet 14 can stream up into the filter bed and filter material from the filter bed can sink down. A detailed description of the mixing section 3 is provided below.

The upper part of the vessel 1 according to an embodiment of the present invention is open, but in other embodiments according the invention it may also be closed. In the centre of the vessel 1 there is a transport system, configured to move the filter material of the filter bed 2 when in operation. The transport system is arranged as a lift pipe 8 that extends along the vertical axis of the vessel 1. In an embodiment according to the present invention a second pipe 9 is located around the lift pipe 8, the second pipe being also called an outer pipe or casing pipe. This outer pipe 9 can be shorter than the lift pipe 8, so that lift pipe 8 extends further downwards to the bottom of the vessel than outer pipe 9.

At the upper end, the outer pipe 9 extends until a point located at a certain distance below the upper end of the lift pipe 8. This outer pipe acts as a separation means between the lift pipe 8 and the filter bed 2, so that the lift pipe can be removed and mounted without interfering with the filter while the filter is filled with water and sand. At the bottom end, the outer pipe 9 extends until a point located at a certain distance above the lower end of the lift pipe 8. Both the lift pipe 8 and the outer pipe 9 end in a conical opening of a cavity 5 that surrounds the lift pipe 8 until below its bottom end.

This cavity 5 is located underneath the filter bed, in the centre of the device. Around said cavity 5 there is located the mixing section 3 from which filter material (sand) is supplied to the transport system and through which influent (water) is streamed into the filter bed. A gas lift injector 4 extends, with its upper end, into the cavity 5, the gas lift injector providing, in operation, a mixture of gas that is blown in from outside the system, and water and sand that enter the gas lift injector 4 from the mixing section 3. In embodiments according to the present invention, the gas is air, but the present invention is not limited thereto. Furthermore, in embodiments according to the present invention, the device is provided with at least two gas lift injectors. These gas lift injectors might be disposed to have their lower ends in different positions surrounding the mixing section, such as in each one of the compartments of the mixing section 3. In this way they can bring the mixture of water and sand, together with the thrusting gas, into the upper part of the cavity 5 from different locations in the mixing section.

In addition, the amount of transported mixture of water and sand can be controlled by controlling the amount of supplied gas. In the case where more than one gas lift injector is applied around cavity 5, the amount of supplied gas can differ for each gas lift injector. This way, the amount of the transported mixture of water and sand can differ for each compartment of the mixing section 3, thus allowing to compensate for unevenly distributed sand in the filter bed or unevenly distributed downwards sand speed in the filter bed.

In an embodiment, there is one gas lift injector 4 per compartment of the mixing section 3. Each gas lift injector 4 is thus adapted to move the mixture of water and granulate material which is provided in its respective compartment to the cavity 5. It is also possible to have multiple gas lift injectors per compartment. The number of compartments in the mixing section 3 can be chosen by the skilled person and will generally depend on the shape of the perimeter of the vessel.

The water to be cleaned enters the system via an input pipe 14 which extends into a space below the mixing section 3, so that filter material which moves downwards through the mixing section 3 will mix with the influent from input pipe 14. The top of the mixing section 3 is open and therefore the water in the influent can also move upwards through the mixing section into the filter bed 2. The water is purified and cleansed as it flows through the filter bed in upward direction, while the impurities that the water contains are retained by the filter bed 2.

The mixture of water, sand and air that enters the cavity 5 via the gas lift injectors 4 enters from there the lift pipe 8. When the mixture with air enters the lift pipe, the specific gravity of the fluid in the lift pipe 8 decreases, that is, the density of the fluid decreases, and it is in turn pumped upwards along the lift pipe.

Furthermore it is possible to operate the system with one air supply connected to the lift pipe 8: the gas enters the filter via the lift pipe 8. The specific gravity of the fluid in the pipe decreases and it is pumped upwards. This flow creates an under pressure in the cavity 5, which will move the mixture of water and granulate material from the mixing section 3, through the gas lift injectors to the cavity 5.

The sand located in the bottom of the filter bed 2 and contaminated with the impurities retained from the water sinks down to the bottom of the mixing section 3, and the sand circulation is based on the airlift principle that forces a mixture of dirty sand and water upwards from the bottom of the mixing section 3 to above the filter bed through the gas lift injector 4 via the cavity 5 and through the lift pipe 8.

The use of this transport system and this mixing section 3 instead of a conical bottom of the filter bed is advantageous in the sense that it allows the sand to be brought to the lower end of the lift pipe 8 in order to be thrust upwards without having the burden of the sand being unevenly distributed in the filter bed, as occurs with known similar filters, and the height of the vessel can be less than that of known similar filters.

The sand that is sent upwards through the lift pipe 8 is mixed with water and impurities such as silt and other solids. The difference in density between the sand and the other impurities facilitates a differential movement as they ascend through the lift pipe 8 and therefore they can be separated. The sand has normally a higher density, and therefore when it arrives at the upper end of the lift pipe, it is the first to slide down to the filter bed to be used again.

The upper ends of both the lift pipe 8 and the outer pipe 9 extend above the filter bed 2. A jacket 15 is located around this section of the lift pipe 8 and outer pipe 9 located above the filter bed 2. The inside of the jacket 15 and the outside of the outer side of the outer pipe 9 are provided with an alternating pattern of ribs with a downward sloping surface on the upper side. These ribs allow the sand sent up through the lift pipe 8 to sink down via the space 16 between the jacket 15 and the outer pipe 9, while clean water from the filter bed 2 can flow upwards through the same space.

By sending the sand up through the lift pipe 8 and then letting it sink again to the filter bed 2, the sand that is located in the top part of the filter bed is the cleanest sand, and the sand that is located in the bottom of the filter bed has the highest concentration of impurities. The sand from the bottom of the filter bed can be refined, and then deposited again in the top of the filter bed. In this way, clean sand is continuously provided, and this continuous cleansing of the sand allows for an optimal continuing water refinement process.

The lift pipe 8 ends up in a secondary vessel 17 that is a so called "washer box". The silt and other impurities mixed with water, which were brought up through the lift pipe and which are already separated from the clean sand due to the different densities, are drained out of the vessel 1 via a draining pipe 18 that is connected to the secondary vessel 17.

The purified water that has ascended upwards through the filter bed 2 and whose impurities have been retained in the filter bed can flow out of the vessel 1 over an overflow edge 19 into a discharge 20 located at a certain height on the inner wall of the vessel 1.

Figure 2:
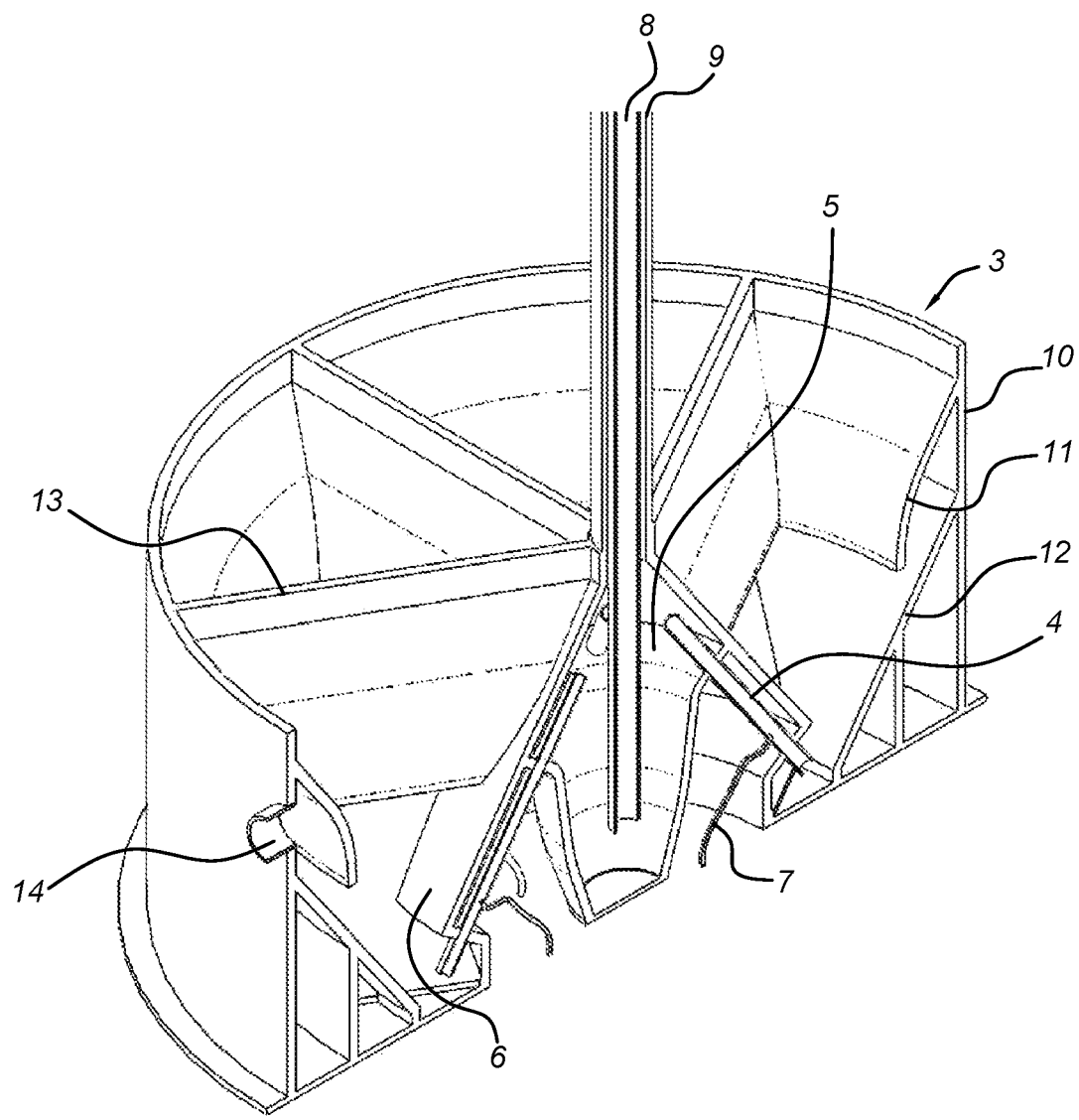
FIG. 2 shows an isometric section view of the lower part of the apparatus in accordance with an embodiment of the present invention.

FIG. 2 shows an isometric section view of the lower part of the filter apparatus in accordance with an embodiment of the present invention. The mixing section is provided with an outer wall 10 and with an inside separator 11 that starts in the upper end of the outer wall and extends in a downwards bent shape until a point at a specific distance below said upper end, which can be approximately the middle vertical point. The space between the outer wall 10 and the inside separator 11 forms an annular conduit or ring line around the mixing section 3.

The mixing section 3 is provided with a radial pattern of cross pieces 13 that extend vertically from the upper end of the mixing section until approximately the middle, coinciding with the height where the inside separator 11 ends, and these cross pieces connect, like bicycle spokes, the inside separator 11 with the centre of the mixing section, this is, with an inner wall 6 that acts as the outer wall of the cavity 5. The undersides of these cross pieces may be connected to the annular conduit ring between outer wall 10 and inside separator 11, so that the influent water is distributed not only via the annular conduit ring, but also via the cross pieces 13. These cross pieces 13 divide the mixing section 3, so that they create compartments in a pie-shape pattern around the centre of the mixing section. In embodiments according to the present invention, there are at least three cross pieces that divide the mixing section in at least three compartments, but it should be clear for a skilled person that any other number of cross pieces would also be possible. Through the annular conduit ring and the cross pieces, the influent water is distributed around the compartments.

The mixing section 3 is also provided with an inclined wall 12 that begins at a small distance above the end of the inside separator 11 and extends until the bottom of the mixing section. This structure of the mixing section allows the sand to sink down towards the bottom centre of the mixing section without the need of a conical structure with a sizable diameter and a sizable height. In other words, the inside separator 11, cross pieces 13, outer wall of cavity 5, and the inclined wall 12 cooperate together to form a funnel structure comprising the plurality of compartments. The funnel structure provided by the plurality of funnel-shaped compartments created by the cross pieces 13 is adapted to guide the filter bed particles mixed with the influent towards a space near the bottom of the vessel where the filter bed particles and the influent can be sucked into the gas lift injectors 4. The tilted position of the gas lift injectors directing the mixture of water, sand and thrusting gas from different locations in the bottom of the compartments to the upper part of the cavity 5 is advantageous. This distribution allows the material to be brought into the transport system from different locations around the bottom section and not from the center of the bottom section, making it possible to have shorter bottom sections and therefore shorter devices, and at the same time providing a faster and efficiently distributed filtering process.

The water enters the system by entering the mixing section 3 via its outer wall through at least one input pipe 14. A plurality of input pipes may also be provided around the outer wall, so that the water can enter the system through different sides of the filter and preferred fluid paths can be avoided. A plurality of input pipes can for example be located in specific positions of the outer wall so that water comes into the system around each one of the different compartments formed by the cross pieces 13. The entering point of the at least one input pipe in the outer wall of the mixing section is located at a height above the starting point of the inclined wall 12, and inside the annular conduit formed by the outer wall 10 and the inside separator 11. In this manner, this input pipe is isolated and protected, and the material located in the mixing section cannot enter the input pipe introducing dirt.

The sand coming down from the filter bed 2 enters the mixing section 3 and mixes with the water entering through the input pipe 14. In the bottom of the mixing section 3, gas lift injectors 4 are located via which the water and sand enter the cavity 5. These gas lift injectors 4 run diagonally, this is, they have one lower end at a specific decentralized location in the bottom of the compartments, and they are tilted towards the center of the device where the upper end of the cavity 5 is located. These gas lift injectors take the mixture of sand and water into their open lower end in the mixing section 3 and thrust it with the injected gas to their open upper end outside the mixing section, located in the upper part of the cavity 5. The inner wall 6 of the mixing section covers the gas lift injectors 4 except from the lower end that is located in the bottom of the mixing section 3 and via which the water and sand enter.

In order for the water and sand to be lifted from the bottom of the mixing section 3 into the cavity 5, gas is injected into the gas flow injectors 4 through gas inflow pipes 7. The mixture of water, sand and air enters the cavity 5 via the gas lift injectors 4 and from there it enters the lift pipe 8 of the transport system.

Figure 3:
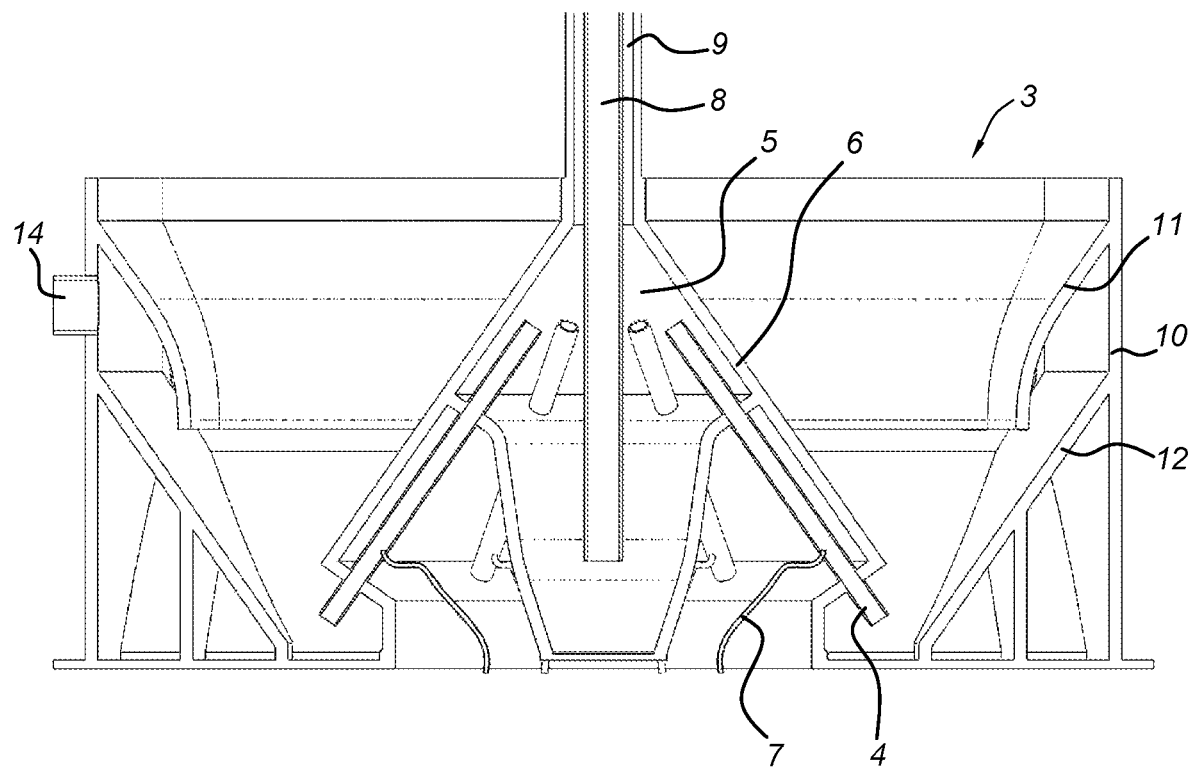
FIG. 3 illustrates a section front view of the lower part of the apparatus in accordance with an embodiment of the present invention.

FIG. 3 illustrates a section front view of the lower part of the filter apparatus in accordance with an embodiment of the present invention. From FIG. 3 it can be seen how the inside separator 11 with its downwards bent shape forms an annular conduit with the outer wall 10. It can also be seen that the inclined wall 12 starts at a height above the end point of the inside separator 11. In this manner, the input pipe 14 via which the water enters the mixing section 3 is isolated and protected, and material located inside the mixing section cannot enter the input pipe. Moreover, the influent is spread around by the annular conduit, so that the influent is evenly distributed and not concentrated around the input pipe 14.

Figure 4:
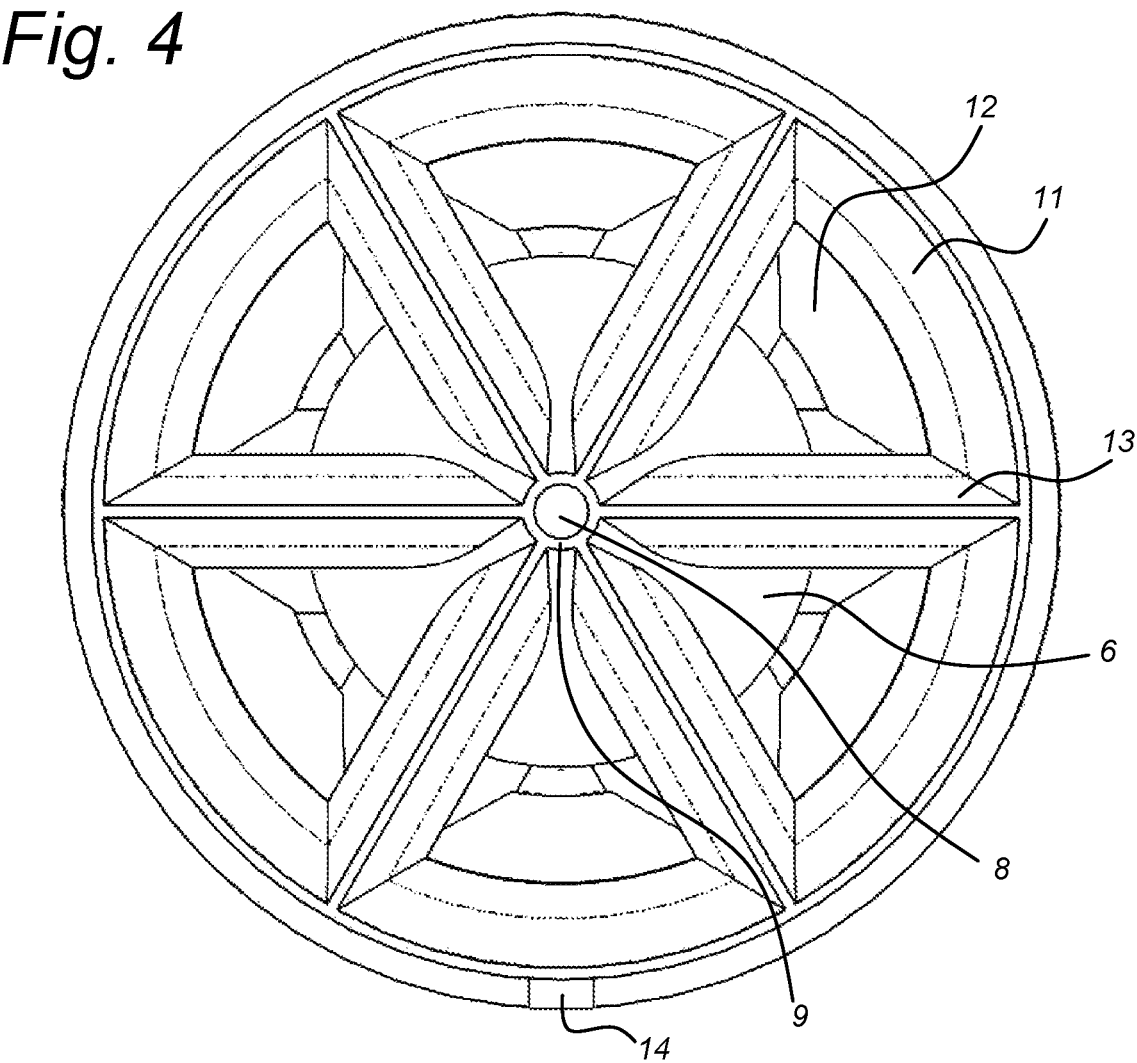
FIG. 4 illustrates a top-down view of the lower part of the apparatus in accordance with an embodiment of the present invention.

FIG. 4 illustrates a top-down view of the filter apparatus in accordance with an embodiment of the present invention From FIG. 4 it can clearly be seen how the cross pieces 13 connect the inside separator 11 with the inner wall 6 of the mixing section 3, and how they are distributed similar to bicycle spokes, dividing the mixing section into a plurality of compartments that form a funnel-shaped structure around the centre of the mixing section. In the embodiment of FIG. 4, the cross pieces 13 divide the mixing section 3 into six compartments which are interconnected at the top and bottom openings. It will be understood that the number of compartments is not necessarily six. A skilled person may design a system according the invention with a different number of compartments.

From FIG. 4 it can also be appreciated how the inside separator 11 creates an annular conduit around the inner part of the outer mixing section wall. It can also be seen how the inclined wall 12 extends until the bottom of the mixing section 3. The inner wall 6 of the mixing section, which acts as outer wall of the cavity 5 located in the central-bottom part of the device, underneath the filter bed 2, has a conical shape which broadens in the downward direction.

Figure 5:
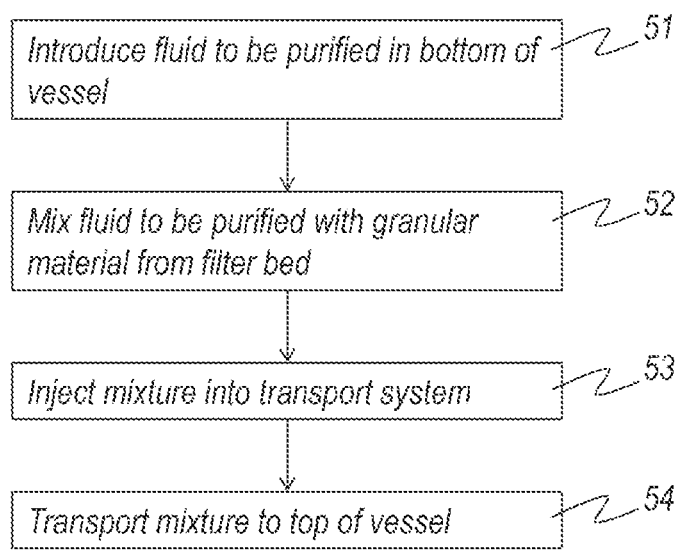
FIG. 5 shows a flow chart of a method for fluid purification in accordance with an embodiment of the present invention.

FIG. 5 shows a flow chart of a method for fluid purification in accordance with an embodiment of the present invention. In step 51 fluid, in this case water, enters the filter device by means of an input pipe 14. This input pipe has one of its ends located in the outer wall 10 of the mixing section 3, inside the annular conduit formed by the outer wall and the inside separator 11. Since the inside separator has a downwards bent shape, it covers the entrance of water via the input pipe and it protects the input pipe 14 from the fluid located inside the mixing section.

Through the mixing section 3, in step 52 water from the influent is mixed with granular filter material, in this case sand of a specific grain size, located in the filter bed 2. The water is therefore cleansed by traversing the filter bed where the impurities are deposited as the water goes upwards.

Sand deposited in the bottom of the mixing section 3 is the sand that has the highest amount of impurities that were retained from the water. This sand is also cleansed so that it can be reused for a continuous cleansing process. For this, in step 53 the sand is transported via gas injection, this is, the sand, together with impurities and water, is brought from the bottom of the mixing section 3 to a transport system via at least one gas lift injector 4. The mixture of sand and water from the bottom of the mixing section enters the gas lift injector 4 and is brought to a cavity 5 located underneath the filter bed 2, surrounded by the mixing section. In order for the sand and water to be able to ascend through the gas lift, gas is injected into the gas lift 4 through gas inflow pipes 7, in this case air, and this air thrusts the sand and water into the cavity 5.

In step 54, the sand and water are brought from the cavity 5 located underneath the filter bed 2 to above the filter bed via a lift pipe 8. The air makes the specific gravity of the mixture of sand and water in the lift pipe 8 decrease, this is, the density of the mixture decreases, and it is in turn pumped upwards along the lift pipe until above the filter bed.

The impurities that arrive at a vessel 17 located in the upper end of the lift pipe can leave the filter via a draining pipe 18. The sand, which is now cleaned, can sink down again to the filter bed so that it can be reused for continuous purification of water. Finally, the water that has reached the upper part of the vessel 1 and has traversed the filter bed 2 completely is now purified, and it can leave the vessel through an overflow edge 19 into a discharge 20 located at a certain height in the inner wall of the vessel 1.

Figure 6B:
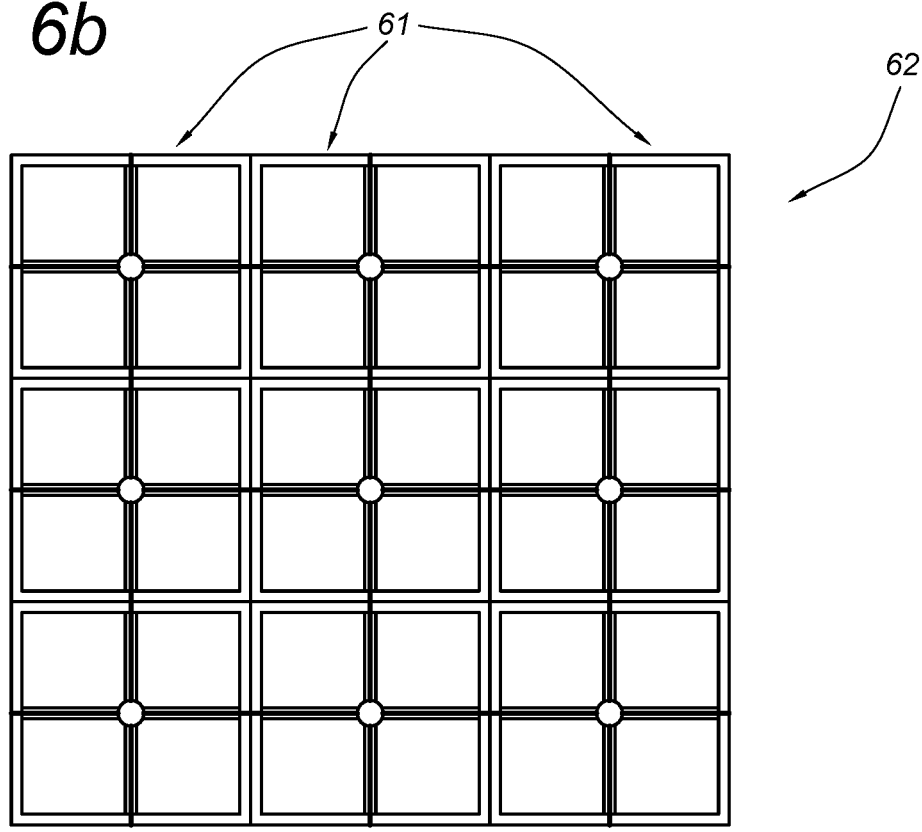
FIG. 6b shows an array of such vessels.

In the above examples, cylindrical vessels have been shown. However, the perimeter of the vessel need not be circular. Other shapes, such as squares, rectangles and hexagons can also be used. FIG. 6*a* illustrates an apparatus according to an embodiment of the invention wherein the vessel 61 has a rectangular perimeter, and FIG. 6*b* shows an array of such vessels 61. Each module 61 in the array 62 comprises vessel 61, riser or lift pipe 8, and outer wall 10 (with inside separator 11) for forming a conduit. In this example, the vessel 61 has a mixing section 3 with four compartments. However, as before, essentially any number of compartments can be arranged. The air lift injectors 4 are also present (not shown), as can be any of the other elements shown in the more detailed examples of FIG. 1-4. The vessels 61 in the array 62 can be interconnected, so that water influent is supplied to all vessels 61 through an interconnected series of conduits (formed by wall 10 and separator 11) and cross pieces 13. One vessel's 61 input 14 is thus connected to another vessel's input 14. Provided that enough outside input's 14 are connected to waste water input, a good distribution of waste water throughout the array can be ensured.

Figure 7A:
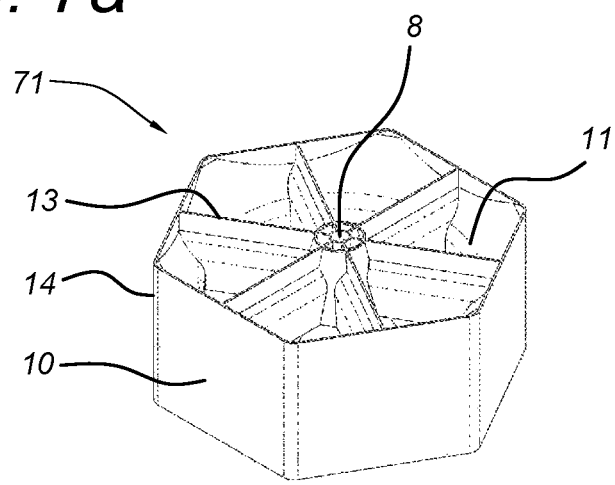
FIG. 7a illustrates an apparatus according to an embodiment of the invention with a hexagonal perimeter.
Figure 7B:
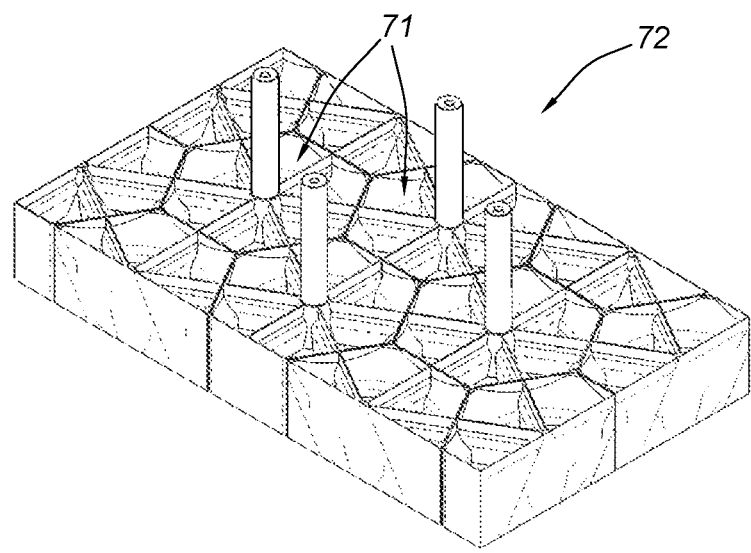
FIG. 7b shows an array of such vessels.

FIG. 7*a* illustrates an apparatus according to an embodiment of the invention where the vessel 71 has a hexagonal perimeter, and FIG. 7b shows an array 72 of such vessels 71. Again, all the details as disclosed in the examples of FIGS. 1-4 can also apply to this embodiment. The vessels 71 in array 72 are interconnected as described in reference to FIG. 6b. While in FIGS. 6b and 7b, arrays of vessels with rectangular and hexagonal perimeters are shown, arrays can be made using vessels with any type of perimeter, including circular perimeters. However, in some cases, such as in the case of the circular perimeter, the result will be empty space between the vessels of an array. It is an advantage of the vessels 61 and 71 that they can be tightly packed in an array.

The present invention provides a filter device with a bottom section considerably shorter than that of known filter devices, and with a vessel that does not include a conical bottom section, but a flat bottom section. This is created by a funnel-shaped structure of compartments located around the center of the bottom section of the device, which together with a gas injection system provided by a plurality of gas injectors allows for an improved and proportional distribution of filtering material over the surface of the filter bed.

The filter apparatus of the present invention might be provided in the form of individual cylindrical tanks, or also within basin installations, such as concrete basin installations wherein the filter devices are introduced in quadrilateral containers and a plurality of containers constitutes filter cells. When a large amount of filter devices must be utilized, it is easier to implement the latter configuration, by providing filter cells constituted by a plurality of containers instead of a large amount of separate filter devices.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. An apparatus for purification of a fluid, the apparatus comprising:
   a vessel (1) for receiving a filter bed (2) with granular filter material;
   a transport system (8) configured to, during operation, transport filter material from a walled cavity (5) underneath the filter bed (2) to a location (17) above the filter bed;
   a fluid inlet (14) for introducing fluid to be purified into the apparatus;
   a mixing section (3) adapted to, in operation, provide a mixture of fluid from the fluid inlet and granular filter material from the filter bed; and
   a plurality of gas lift injectors (4) within said walled cavity, wherein each gas lift injector (4) is configured to, in operation, transport the mixture of fluid from the fluid inlet (14) and granular filter material from the filter bed (2) to the walled cavity (5), wherein at least one gas lift injector (4) comprises a pipe which runs diagonally upwards from an off-center position towards a center axis of the walled cavity (5).

2. The apparatus according to claim 1, wherein the bottom of the vessel has a flat outside surface.

3. The apparatus according to claim 1, wherein the walled cavity (5) is defined by a conical outer wall that broadens in a downward direction.

4. The apparatus according to claim 1, wherein the mixing section (3) is provided in the lower half of the vessel (1) and wherein the mixing section has an open top in fluid connection with the filter bed and an open bottom in fluid connection with the fluid inlet (14).

5. The apparatus according to claim 4, wherein the top opening of the mixing section (3) is larger than the bottom opening.

6. The apparatus according to claim 1, wherein the mixing section (3) is divided, by one or more cross pieces (13), into a plurality of compartments.

7. The apparatus according to claim 1, wherein the mixing section (3) is adapted to guide, in operation, a mixture of influent fluid and granular material to an inlet of at least one gas lift injector (4).

8. The apparatus according to claim 1, wherein at least one gas supply is configured to regulate the amount of gas supplied to the gas lift injectors (4).

9. The apparatus according to claim 8, wherein each of said at least one gas supplies is configured to supply a different amount of gas to the gas lift injectors (4).

10. The apparatus according to claim 1, wherein the at least one mixing section (3) comprises an outer wall (10) and an inside separator (11), and wherein a space between the outer wall and the inside separator forms an annular conduit.

11. The apparatus according to claim 10, wherein the fluid to be purified enters the apparatus by means of at least one input pipe (14) whose end is located inside the annular conduit formed between the outer wall (10) and the inside separator (11) of the mixing section (3).

12. The apparatus according to claim 1, wherein the at least one mixing section (3) comprises an inclined wall (12) that extends from the outer mixing section wall (10) until the bottom of the mixing section.

13. The apparatus according to claim 1 wherein the at least one mixing section (3) surrounds the walled cavity (5), and the outer wall of the cavity is an inner wall of the mixing section.

14. The apparatus according to claim 1, comprising a plurality of fluid inlets (14) for introducing fluid to be purified into the apparatus.

15. The apparatus according to claim 1, further comprising at least one gas supply connected to the transport system (8), wherein the at least one gas supply is configured to supply gas directly into the transport system and to pump the material in the transport system in an upward direction.

16. An array of purification apparatuses comprising:
   a plurality of apparatuses according to claim 1, wherein at least two of the plurality of apparatuses are interconnected to distribute the fluid to be purified among the at least two of the apparatuses.

17. A method for purification of a fluid, the method comprising the steps of:

introducing (51) an influent fluid to be purified into the apparatus of claim 1 for purification;

mixing (52) the influent fluid with granular filter material from said filter bed (2) in the apparatus for purification; and feeding (53) the mixture of the influent fluid with granular filter material via said plurality of gas lift injectors (4) within said walled cavity to said transport system for bringing the filter material from an off-center location underneath the filter bed to a location above the filter bed.

\* \* \* \* \*